June 8, 1954    F. L. LE BUS    2,680,483
METHOD AND APPARATUS FOR RECOVERING LOST DRILL PIPE
Filed May 2, 1949    3 Sheets-Sheet 1

INVENTOR.
F. L. LeBUS
BY
C. M. McKnight
ATTORNEY

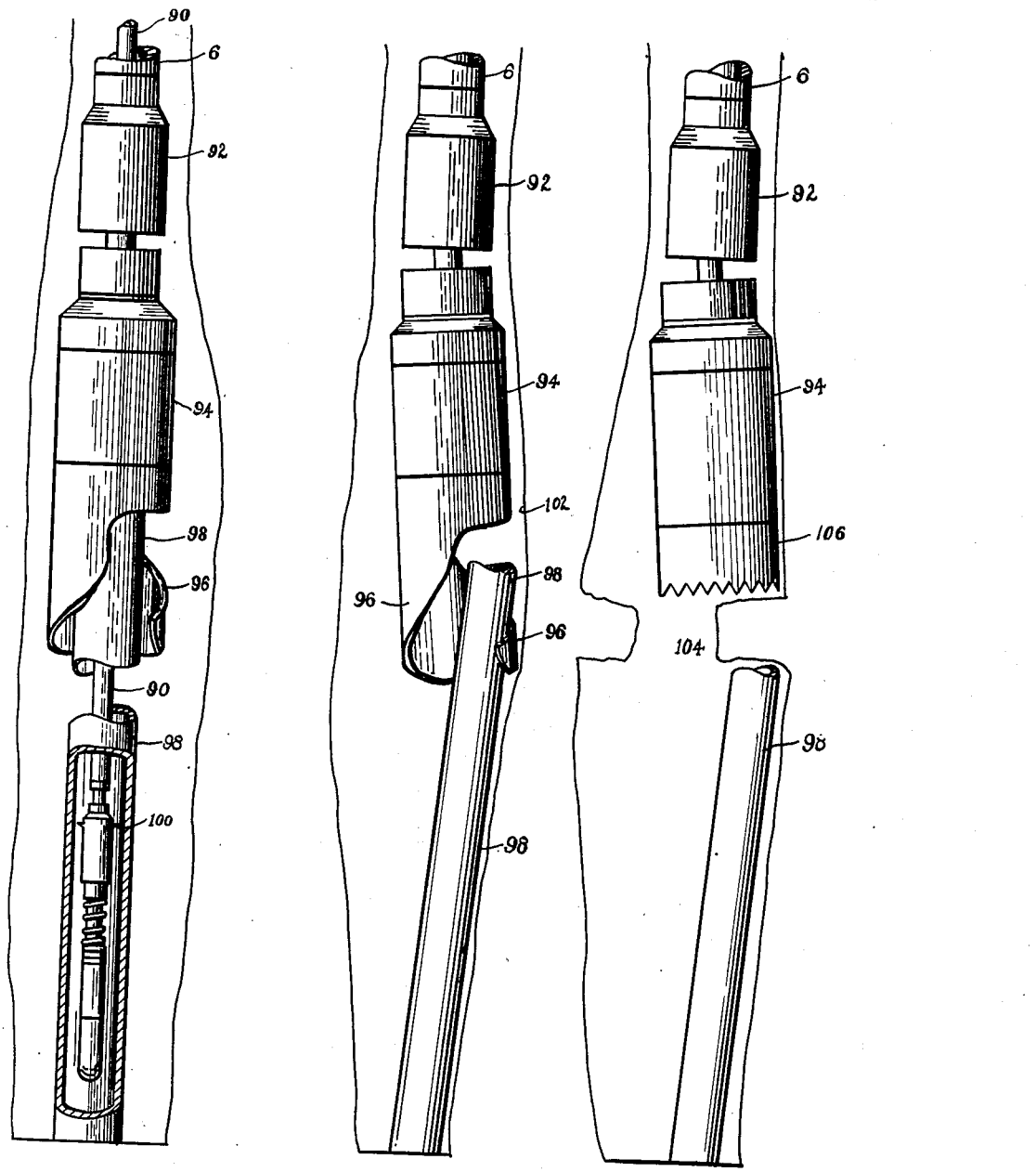

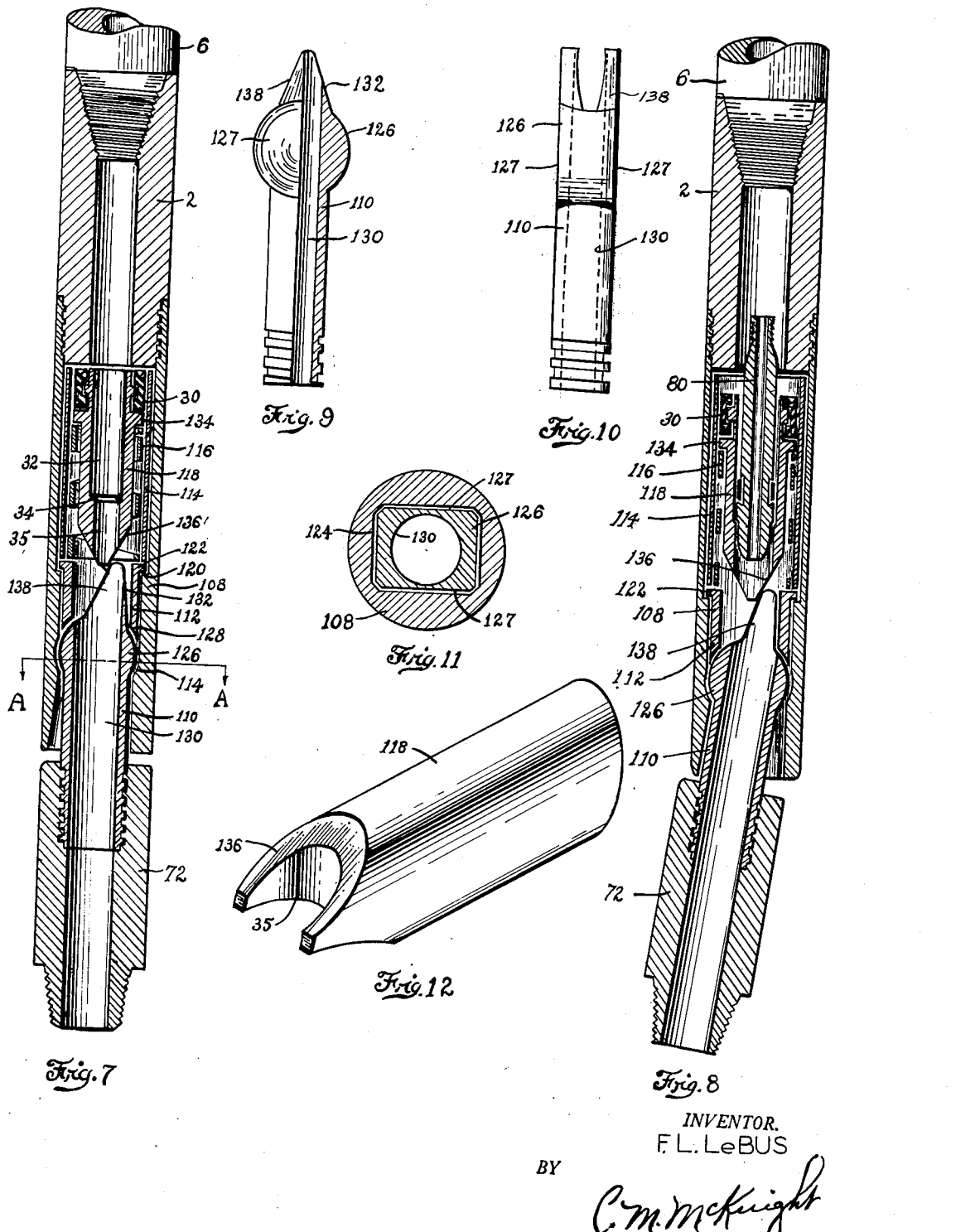

Patented June 8, 1954

2,680,483

UNITED STATES PATENT OFFICE 2,680,483

METHOD AND APPARATUS FOR RECOVERING LOST DRILL PIPE

Franklin L. Le Bus, Longview, Tex.

Application May 2, 1949, Serial No. 90,936

4 Claims. (Cl. 164—0.7)

This invention relates to a method and apparatus for fishing for lost drill pipe and more particularly, but not by way of limitation, to the method of fishing for drill pipe with a knuckle joint provided with an open bore adapted for seating a retrievable restriction plug.

In the rotary method of drilling wells such as oil or gas wells, the drill pipe is occasionally broken and it is necessary to "fish" for and recover that portion of the pipe which has been lost in the hole. It is important that the fishing job be performed expeditiously, since the cuttings in the stagnant drilling mud may settle out around the bottom of the lost drill pipe, causing it to become stuck in the hole. In conventional practice, a fishing tool, such as an overshot, is lowered into the hole on a string of pipe for the purpose of engaging the lost pipe and retrieving it from the hole. A knuckle joint may be used above the overshot for the purpose of diverting the overshot into a cave-in or wash-out in the well bore in the event the lost pipe is laying over to one side of a wash-out.

Conventional knuckle joints are provided with circuitous openings for the circulation of mud during the fishing operations, but the openings are not adapted for the passage of tools through the knuckle joint. Therefore, in the event that the lost pipe or "fish" is engaged and is found to be stuck, it is necessary to release the fish and make a complete trip with the fishing string of pipe in order to remove the knuckle joint, so that a cutter may be lowered through the fishing string and the lost pipe to the point where the pipe is stuck. Further, it will be apparent that, in the event the drilling operator omitted the knuckle joint on the first trip for fear the pipe would be stuck and a second trip with a knuckle joint is needed because of a cave-in, the opportunity for the pipe to become stuck is greater because the time required for the second trip allows more cuttings to settle and pack around the lost pipe. A stuck pipe would then require a third trip in order to cut the pipe and one or more trips to recover the stuck portion of pipe.

The present invention is concerned with fishing for lost drill pipe with a knuckle joint provided with a full-opening bore through which inside cutters, measuring lines or logging instruments may be run, which thereby provides means for stuck pipe to be straightened, engaged by the overshot, cut and pulled with only one trip with the fishing string.

An important object of my invention is to provide a new method for fishing and for controlling the knuckling action of a knuckle joint.

Another object of my invention is to provide a knuckle joint which will not be operated by mud circulation until the operator desires such knuckling action.

Another object of my invention is to provide a knuckle joint having a sufficiently large bore so as to provide access for inside cutters, measuring lines, logging instruments and the like.

Another object is to provide a method for fishing for lost drill pipe whereby the "fish" may be engaged expeditiously and, if found to be stuck, may be cut and pulled with one trip of the fishing string.

And still another object of this invention is to provide a knuckle joint which may be used in fishing jobs as a matter of standard practice whether the drilling operator anticipates difficulties from either wash-outs, or stuck pipe, or both.

Other objects and advantages of the invention will be evident from the following detailed description, read in conjunction with the accompanying drawings, which illustrate my invention.

Fig. 4 is a side elevational view with certain parts in section of the knuckle joint, drill pipe overshot, and wall hook in a hole with the fish engaged and an inside cutter lowered into position for cutting a stuck drill pipe.

Fig. 5 is a side elevational view of a knuckle joint, overshot and wall hook guide in operative position in a hole and hooking the fish lying over to one side of a washed-out cavity.

Fig. 6 is a side elevational view of a knuckle joint, overshot, and mill guide in operative position for reaming a ledge under which the fish is located.

Fig. 7 is a sectional elevational view of a knuckle joint embodying a modified form of my invention.

Fig. 8 is a sectional view of the knuckle joint of Fig. 7, with the restriction plug in place and with the knuckle joint in the knuckled or operative position.

Fig. 9 is a partially sectional side elevational view of the knuckling stem used in the modified knuckle joint.

Fig. 10 is an elevational view of the knuckling stem at right angles to Fig. 9.

Fig. 11 is a sectional view A—A of Fig. 7, illustrating the knuckling cylinder and socket of the modified knuckle joint.

Fig. 12 is a fragmentary perspective view of the lower end of the control piston used in the modified knuckle joint, illustrating the bevel construction which causes the knuckling action when the piston is actuated.

In the following description the term "full-opening bore" will be used to designate a hole as large as or larger than the hole in the tool joints of the fishing string used to run the knuckle joints.

Figure 1:
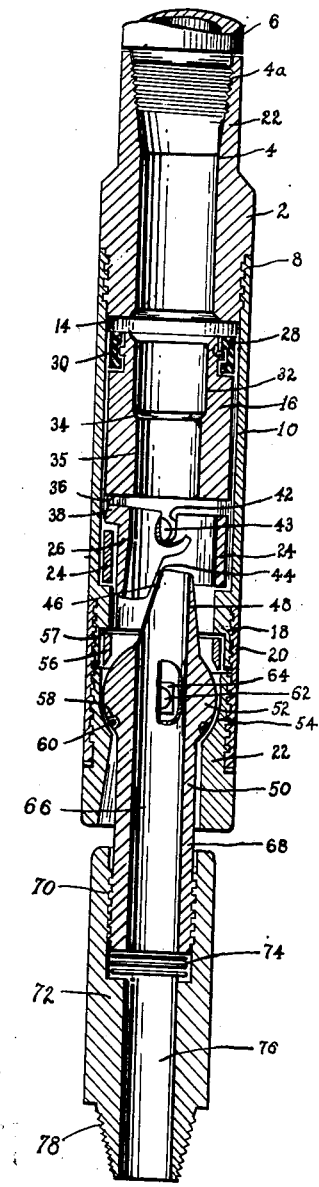
Fig. 1 is a sectional elevational view of a knuckle joint embodying one form of my invention.

Referring to Fig. 1, reference character 2 represents the upper apertured plug or collar of the knuckle joint. The plug 2 is provided with a bore 4 having standard tool joint internal threads 4a for connection to the fishing string 6. The lower end of plug 2 is provided with external threads 8 for connection to the sleeve housing 10. The bottom of the plug 2 depends inside the sleeve 10 and serves as a shoulder 14 to limit the upward travel of a control piston 16, housed within the cylindrical member 10. The housing 10 is provided with threads 18 for enaggement with a connecting collar 20 which is joined to the pivot member 22 by suitable threads 18. The sleeve 10 houses the operating parts such as the control piston 16, and the control lever cage 24 in which is disposed the control lever 26.

The upper end of control piston 16 is grooved circumferentially and provided with a circular flange 28 for retaining a rubber packing ring 30. A full-opening bore 32 extends part way throughout the piston 16, and is provided with a shoulder 34 which serves as a seat for the restriction plug described hereinafter. The lower portion of bore 32 is of decreased diameter as at 35 and is ordinarily the smallest opening throughout the knuckle joint, but is still large enough for passage of inside cutters, logging tools, and the like. The bottom face 36 of the piston 16 is in vertical alignment with a shoulder 38 of the control lever 26. The control lever 26 is hinged by diametrically opposed pins or lugs 40 disposed in recesses 42 provided in the control lever cage 24. The contact face 44 of the downwardly extending control lever arm is in alignment for contact with the face 46 of the upwardly extending tapered projection 48 of the pivot joint 50. The control lever 26 is preferably U-shaped and is disposed in the control lever cage 24 so as to provide a full-opening bore therethrough.

The pivot joint 50 is provided with a ball joint 52 disposed in the spherical socket or recess 54 of the pivot body 22. The ball joint 52 is retained in place by the retainer ring 56 disposed in the lower shouldered portion 57 of the sleeve 10. The ball joint 52 is provided with a latitudinal groove 58 having a rubber packer ring 60 for the purpose of sealing off mud or fluid leakage through the ball and socket joint. The ball joint 52 is provided with diametrically opposed circular recesses 62 having an axis passing through the center of the ball joint 52 and parallel to the plane of the contact face 46. Driving lugs 64 are provided in the recesses 62 which serve to turn the pivot joint 50 while permitting the desired knuckling action. The pivot member 50 is also provided with a full-opening bore 66 throughout. At the lower extremity 68 of pivot joint 50 is connected by suitable threads 70 to a bottom sub member 72. Spacer washers 74 are used as shims for the purpose of orienting tools, such as a wall hook guide hereinafter described. The bottom sub member 72 is provided with a full-opening bore 76 and a standard tool joint pin 78 for connecting suitable fishing tools to the knuckle joint.

Figure 3:
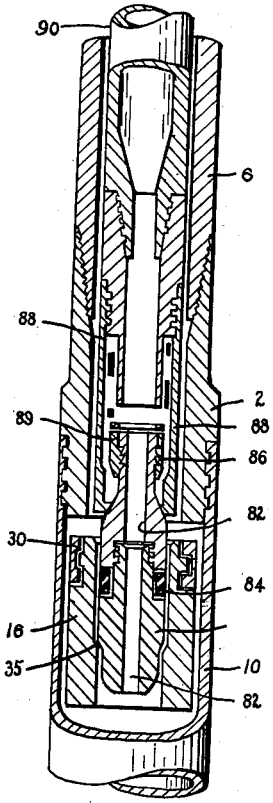
Fig. 3 is a fragmentary sectional elevational view of the knuckle joint illustrating the restriction plug engaged by the restriction plug overshot.
Figure 2:
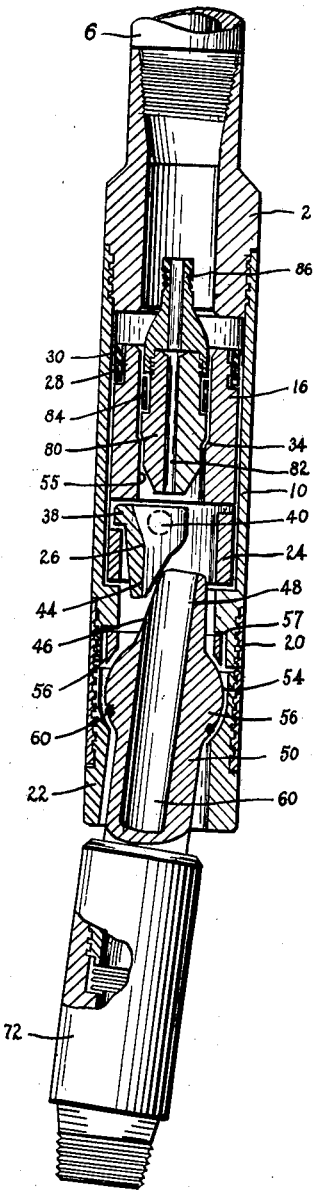
Fig. 2 is a similar view of the knuckle joint of Fig. 1 with the restriction plug in place and with the knuckle joint in the knuckled or operative position.

Referring to Fig. 2, an apertured restriction plug 80 has been dropped through the fishing string 6 and is seated on the shoulder 34 of the control piston 16. The restriction plug causes mud pressure to build up above the control piston 16 in order to actuate the knuckle joint. The restriction plug 80 is provided with a small bore 82 through the center so that limited circulation of mud may be maintained to the fishing tools. The restriction plug is provided with a rubber packing ring 84 circumferentially around the outer periphery. The upper extremity of the restriction plug 80 is of reduced diameter having circumferential serrations 86 adapted for engagement with the restriction plug overshot 88 (Fig. 3) adapted to be run in the string 6 on a macaroni string 90 or a wire line (not shown) for the purpose of retrieving the restriction plug 80.

Operation of knuckle joint

In the event knuckling action is desired during a fishing job, the restriction plug 80 is dropped into the fishing string 6 and pumped down by mud or fluid circulation until it seats on shoulder 34 of the knuckle joint control piston 16. During fluid circulation, the bore 82 of the restriction plug causes an increase in pressure above the control piston 16, to move the piston 16 downward against control lever shoulder 38. The control lever 26 is thereby pivoted about hinge pins 40, and through pressure exerted between contact faces 44 and 46 the control lever 26 causes the pivot joint 50 to be rotated in a clockwise direction as illustrated in Fig. 2.

If it is desired to remove the restriction plug 80 from the knuckle joint, a restriction plug overshot 88 (Fig. 3) is run in the string 6 on the macaroni tubing 90 until the restriction plug 80 is contacted and engaged by the serrated dogs 89 of the overshot. The macaroni tubing 90 is then removed from the hole together with the restriction plug 80.

With the use of my new knuckle joint, having an open bore throughout, important improvements in the art of fishing for lost drill pipe are possible. Referring to Figs. 4 and 5, the knuckle joint unit 92 may be run with a drill pipe overshot 94, and a wall hook guide 96 over the drill pipe 98. After engagement by the overshot 94, if the lost pipe or fish 98 is found to be stuck, an inside cutter 100 is run on the macaroni tubing 90 through the bore of the knuckle joint 92, and the drill pipe 98, down to the point where it is stuck, such as illustrated in Fig. 4, in order to cut and recover the pipe. Since a full passageway for the inside cutter is provided in the knuckle joint unit 92, it is unnecessary to make a round trip in the well bore with the fishing string to remove the knuckle joint.

Referring to Fig. 5, in the event the lost pipe 98 is lying to one side of a cave-in 102, the restriction plug is pumped down through the fishing string 6 into position against the piston 16, so as to permit the knuckle joint 92 to be operated as illustrated in Fig. 5. The wall hook guide 96 may be rotated with the knuckle joint unit 92 until the fish 98 is caught, as shown, and the fish 98 may be straightened by continued rotation, whereupon the overshot is lowered into engagement therewith in the usual manner. It will be apparent that, before going into the hole, the wall hook guide 96 must be oriented so as to be open at right angles to the direction of knuckling by adjustment of the total thickness of the shim washers 74 (Fig. 1).

In the event the fish 98 cannot be caught by a wall hook guide because of a ledge 104, as shown in Fig. 6, a mill guide 106 may be run below the knuckle joint 92, and overshot 94 in order to ream out the ledge and contact the fish.

From the foregoing it will be apparent that the invention contemplates the use of a knuckle joint which has an open bore suitable for the passage of tools therethrough, and which is rendered operable by means of a retrievable restriction plug together with the well mud pressure.

Figs. 7 through 12 illustrate a modified form of my invention wherein certain mechanical details differ from the preferred embodiment of my invention described hereinabove. Referring to Figs. 7 and 8, the collar 2, fishing string 6, rubber packer ring 30, restriction plug 80 and the bottom sub 72, together with their detailed elements, are similar to the corresponding parts shown in Figs. 1 and 2. The cylindrical housing 108 encases a pivotal member 110, retainer ring 112, and the spacer cylinder 114, in which is disposed the flat helical compression spring 116 and the control piston 118. The housing 108 is provided with an internal shoulder 120 supporting the retainer ring 112 by the flange 122. The lower portion of the main body 108 is provided with a socket 124, receiving the circular joint 126 of the pivot member 110. The joint 126 is clearly illustrated in Figs. 9, 10 and 11. The joint 126 provides for the longitudinal swiveling action of the pivot member 110 and also the desired axial rotation of the entire knuckle joint as a unit by virtue of the flat faces 127. The lower face 128 of retainer ring 112 is curved to mate with the circular joint 126. The pivot member 110 is provided with a full-opening bore 130 throughout and has upwardly extending slightly offset ears 132 for purpose of contacting the control piston 118 to provide the knuckling action.

The flat helical spring 116 is in compression against the retainer ring 112, and the shoulder 134, of the control piston 118. The control piston 118 is thereby normally held in an elevated position. The control piston 118 is provided with a full-opening bore 32, an internal shoulder 34, and the slightly smaller bore 36 for the purpose of seating the restriction plug 80 (Fig. 8) as described in the preferred embodiment. The bottom extremity of the modified control piston 118 has a beveled portion 136 which is in operational contact with the face 138 of the upstanding ears 132 of the pivot member 110. The beveled or angled construction of the contact portion 136 is clearly illustrated by Fig. 12.

With the restriction plug 80 disposed in the piston 118 as shown in Fig. 8, circulating mud pressure causes the control piston 118 to move downward, thus compressing spring 116, and knuckling the pivot member 110 about the axis of joint 126, by bearing pressure between contact faces 136 and 138. When the mud pressure is released, compression spring 116 returns control piston 118 to its normal elevated position and the pivot member 110 moves back to a normal vertical position, since its center of gravity is below the pivoting axis of the joint 126.

It will be apparent that the modified structure shown in Figs. 7 to 12, inclusive, differs from the preferred embodiment mainly by the elimination of the control lever 24 of the preferred embodiment. The control piston 118 is modified to provide the tapered face 136 for direct contact with the pivotal member 110 to cause actuation of the knuckle joint.

From the foregoing it will be apparent that the present invention is particularly adaptable for retrieving lost pipe or "fish" in a well bore, and particularly a lost fish that may be disposed in a cave-in or the like, wherein the lost fish may be retrieved from the well bore with only one trip of the knuckle joint and the fishing string. The full opening aligned bores provided in the control piston and the pivotal element of the knuckle joint provide for the insertion of inside cutters or like tools therethrough in order to cut off the stuck fish when it has been determined by jarring action that the fish cannot be removed otherwise.

The rubber packing of the ball and socket joint in the pivotal member forms an efficient sealing means to prevent washouts due to fluid circulation, at the same time providing for a maximum of water circulation through the knuckle joint in order to provide an extensive washing in the well bore without any danger of washing or destroying the mechanical parts. Circulation is maintained with the restriction plug in place through the smaller aperture provided therein. It will be apparent that the aperture of the control piston may be variable because of variation in the bore of tool joint pins. However, this is merely a matter of furnishing the proper size control piston, and restriction plug for the type of tool joint utilized in the washing string.

Changes may be made in the combination and arrangement of parts as heretofore set forth in the specification and shown in the drawings, it being understood that any modification in the precise embodiment of the invention may be made within the scope of the following claims without departing from the spirit of the invention.

What I claim is:

1. In a knuckle joint apparatus for use with a fishing string in an oil well bore comprising a body having a longitudinal bore therein, a pivotal member disposed in the body, a control piston and a control lever disposed in the body above the level of said pivotal member, said pivotal member, control piston, and lever each having communicating bores therethrough, an elongated plug slidingly disposed in the bore of the control piston means to limit downward movement of said plug in said bore, said plug being freely movable in an upward direction, said plug having a bore of small diameter for increasing the pressure of the fluid circulation in the fishing string to force the piston downward and cause movement of the pivotal member in an outward direction, said plug being removable in an upward direction through the bore in said body to provide clearance through the communicating bores.

2. The method of recovering broken-off stuck drill pipe normally lodged in a cave-in of a well bore, which consists of lowering a pivotal moving fishing tool into the well bore adjacent to the broken off pipe section, knuckling the pivotal tool into contact with the broken pipe, retracting the knuckling action of the pivotal tool for aligning the contacted broken pipe with the well bore, lowering cutting tools through the fishing tool without removing the fishing tool from the well bore, cutting the stuck portion of the pipe and removing it from the well.

3. The method of recovering broken off drill pipe normally lodged in a cave-in of a well bore, which consists of lowering a transverse swinging fishing tool into the well bore adjacent to the broken off pipe, knuckling the tool for swinging into contact with the pipe, retracting the knuckling action of the tool for aligning the contacted pipe with the well bore, lowering cutting tools through the fishing tool without removing the fishing tool from the well bore, cutting the lodged portion of the pipe and removing it from the well.

4. The method of recovering broken-off drill pipe from a well bore, which consists of lowering a fishing tool into the well bore in engagement with the broken-off pipe, lowering cutting tools through the fishing tool without removing the fishing tool from the well bore, cutting a portion of the pipe and removing it from the well.

References Cited in the file of this patent

UNITED STATES PATENTS

| Number | Name | Date |
|---|---|---|
| 1,696,378 | Brauer | Dec. 25, 1928 |
| 1,718,771 | Baker | June 25, 1929 |
| 1,908,174 | O'Grady | May 9, 1933 |
| 2,078,426 | Sweet | Apr. 27, 1937 |
| 2,199,029 | Barrett et al. | Apr. 30, 1940 |
| 2,285,213 | Le Bus | June 2, 1942 |
| 2,315,629 | Le Bus | Apr. 6, 1943 |